United States Patent
Taylor et al.

(10) Patent No.: US 8,112,807 B2
(45) Date of Patent: Feb. 7, 2012

(54) SYSTEMS, METHODS, AND APPARATUSES FOR ERASING MEMORY ON WIRELESS DEVICES

(75) Inventors: Kirk S. Taylor, San Diego, CA (US); Guilherme Luiz Karnas Hoefel, San Diego, CA (US); Liren Chen, San Diego, CA (US); Jack Steenstra, San Diego, CA (US); Lucian Suta, Mission Viejo, CA (US); Yang Zhang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 852 days.

(21) Appl. No.: 11/936,471

(22) Filed: Nov. 7, 2007

(65) Prior Publication Data

US 2009/0119468 A1    May 7, 2009

(51) Int. Cl.
*G06F 12/14*    (2006.01)
(52) U.S. Cl. ........................................................ 726/26
(58) Field of Classification Search .................... 726/26, 726/35
See application file for complete search history.

(56) References Cited

U.S. PATENT DOCUMENTS

| | | | | |
|---|---|---|---|---|
| 4,593,384 | A * | 6/1986 | Kleijne | 365/228 |
| 5,970,405 | A * | 10/1999 | Kaplan et al. | 455/410 |
| 6,842,861 | B1 * | 1/2005 | Cox et al. | 713/188 |
| 7,373,516 | B2 | 5/2008 | Ashok et al. | |
| 2002/0162011 | A1 * | 10/2002 | Tanaka et al. | 713/200 |
| 2003/0135748 | A1 * | 7/2003 | Yamada et al. | 713/193 |
| 2005/0138390 | A1 * | 6/2005 | Adams et al. | 713/185 |
| 2005/0198525 | A1 * | 9/2005 | Trossen et al. | 713/200 |
| 2010/0115579 | A1 * | 5/2010 | Rensin et al. | 726/1 |

FOREIGN PATENT DOCUMENTS

| | | |
|---|---|---|
| EP | 1585007 A1 | 10/2005 |
| WO | WO0212985 A2 | 2/2002 |

OTHER PUBLICATIONS

International Search Report and Written Opinion—PCT/US2008/082878, International Search Authority—European Patent Office—Apr. 6, 2009.

* cited by examiner

*Primary Examiner* — Ellen Tran
(74) *Attorney, Agent, or Firm* — James T. Hagler (57) ABSTRACT

A wireless device having a memory is provided. The memory or a protected portion of the memory is subject to a hard erasure of the memory vs. a soft erasure of the memory if a plurality of sensors indicate a threat to the device exists. The threat may be detected by a plurality of sensors, such as, a timer, a connectivity sensor, a location sensor or geo-fence, a breech sensor, an authentication procedure or the like.

14 Claims, 8 Drawing Sheets

SYSTEMS, METHODS, AND APPARATUSES FOR ERASING MEMORY ON WIRELESS DEVICES

CLAIM OF PRIORITY UNDER 35 U.S.C. §119

None.

CLAIM OF PRIORITY UNDER 35 U.S.C. §120

None.

REFERENCE TO CO-PENDING APPLICATIONS FOR PATENT

None.

BACKGROUND

1. Field

The technology of the present application relates generally to erasing memory for wireless devices, and more specifically to systems, methods, and apparatuses for hard erasing memory on wireless devices when a threat or inappropriate access or attempted access is possible.

2. Background

Wireless devices and, in particular, cellular telephones are ubiquitous today. Cellular telephones, for example, are no longer simply devices to provide voice communication between individuals, but are now powerful processing devices. Cellular telephones, for example, may be used to store and process data. Cellular telephone or cell phone is used interchangeably with wireless device herein, but a wireless device is not limited to cellular telephones and may include other wireless devices, such as, for example, desktop computers, laptop computers, handheld computers, electronic games, portable digital assistants, MP3 players, DVD players, or the like.

With the increase in processing and storage capacity of cellular telephones, people have begun to store personal, sensitive, and sometimes embarrassing information on their cellular telephones or wireless devices. The information may include, for example, banking information, personal health information, pictures, video clips, contact lists, credit card information, and the like.

While keeping personal and sensitive information on cellular telephones is convenient, it causes some issues. Some cellular telephones are lost or stolen. Moreover, cellular telephones are frequently sold on secondary markets. Thus, deleting personal, sensitive, and embarrassing information is necessary.

Using conventional techniques, erasing information from memory involves indicating to the processor that the memory space is free to receive new information from a write (or a read/write) module. However, the data remains stored in memory until the write module writes new information to the memory space. Thus, in other words, only the pointer to the data is erased and the data remains stored in memory. For convenience, deleting the pointer but not the data is referred to as a "soft erase". Some companies have begun addressing this problem by allowing the owner or user of the cellular telephone to "hard erase" telephones. Hard erase in this application means indicating to the processor the memory space is available as well as actively replacing the data in the memory space with new data. The new data may be a predefined data series or random data.

Currently, some cellular telephones provide mechanisms for initiating a hard erase protocol. For example, one mechanism requires entering a password on the device. By entering the password, the device initiates the hard erase protocol. The password may be input directly from the cellular telephone or transmitted to the telephone from a separate location using a conventional wireless data protocol. Other cellular devices accomplish hard erasing by keystrokes or other predefined protocols.

Although some mechanisms for hard erasure of data stored in cellular telephone memory are available, it would be desirous to provide improved systems, methods, and apparatuses for hard erasing memory in cellular and other wireless devices.

SUMMARY

Embodiments disclosed herein address the above stated needs by providing a threat detector and hard erase module to hard erase the memory of the wireless device when a threat is detected. The threat may be an actual physical threat to the device or other indications that indicate the likelihood that the wireless device has been lost, stolen, or otherwise compromised.

In one aspect, a method for automatically hard erasing data on a wireless device based on a threat determination to inhibit unauthorized access to data is provided. The method comprises monitoring at least one sensor in the wireless device that provides information relating to a status of the wireless device. Using the sensed information regarding the status to make a determination regarding whether a threat to the data exists and hard erasing the data stored on the wireless device based on the determination of the threat.

In another aspect, a method of memory management is provided. The memory management removes data as it is determined to not be needed by the wireless device.

In still another aspect, a wireless device is provided. The wireless device includes a control processor a control processor for control the functions of the wireless device and a memory that stores executable code usable by the control processor to perform the functions of the wireless device and data. The wireless device includes transmit and receive circuits to provide modulation and demodulation of communication signals between an antenna and the control processor. A threat detector monitors the wireless device to determine threats to the data stored in memory and a hard erase module to hard erase at least a portion of the memory to remove data on a threat indication from the threat detector.

The foregoing and other features, utilities and advantages of the device and system will be apparent from the following more particular description of embodiments of the invention as illustrated in the accompanying drawings.

DETAILED DESCRIPTION

The technology of the present application will now be described with reference to the figures. While the technology is described with specific reference to cellular telephones, one of ordinary skill in the art will now recognize on reading the disclosure that the technology described is applicable to other wireless devices, such as, for example, handheld computers, laptop computers, desktop computers, or the like. Wireless devices and cellular telephones are used interchangeably herein. Moreover, the technology of the present application is described with reference to specific exemplary embodiments. The word "exemplary" is used herein to mean "serving as an example, instance, or illustration." Any embodiment described herein as "exemplary" is not necessarily to be construed as preferred or advantageous over other embodiments. Additionally, all embodiments described herein should be considered exemplary unless otherwise stated.

The word "network" is used herein to mean one or more conventional or proprietary networks using an appropriate network data transmission protocol. Examples of such networks include, PSTN, LAN, WAN, WiFi, WiMax, Internet, World Wide Web, Ethernet, other wireless networks, and the like.

The phrase "wireless device" is used herein to mean one or more conventional or proprietary devices using radio frequency transmission techniques. Examples of such wireless devices include cellular telephones, desktop computers, laptop computers, handheld computers, electronic games, portable digital assistants, MP3 players, DVD players, or the like.

The phrase "soft erase" is used herein to mean indicating a portion of memory is available to accept new data. The availability may be indicated by deleting information in a data look up table or the like.

The phrase "hard erase" is used herein to mean indicating a portion of memory is available to accept new data and overwriting the memory field with a predetermined data string or random data.

Figure 1:
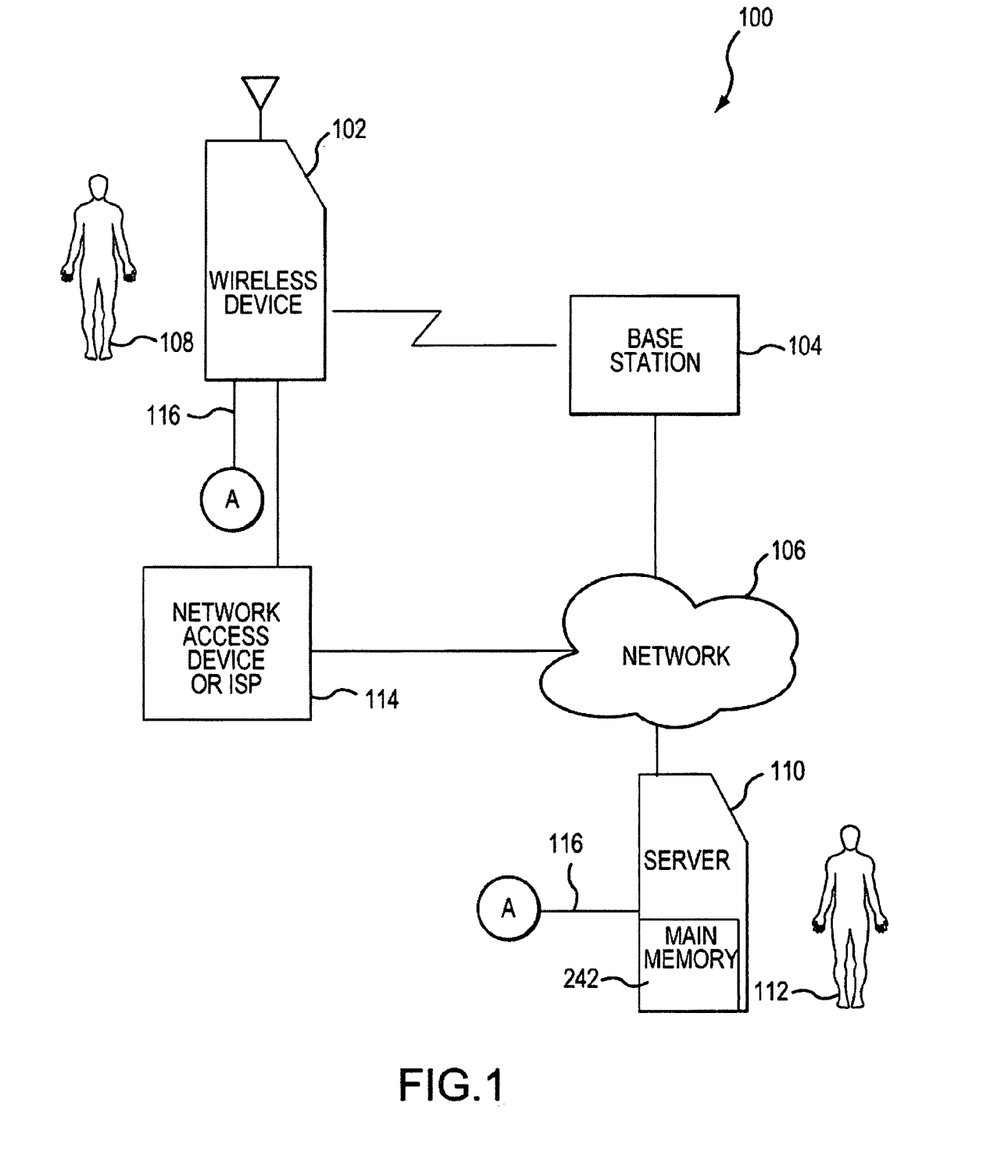
FIG. 1 is a block diagram illustration of a wireless communication system of an exemplary embodiment of the disclosure.

FIG. 1 illustrates a wireless communications network 100 of an exemplary embodiment. In this embodiment, the wireless communications network 100 includes a wireless device 102, which is usable by an individual or user 108, connected by a wireless communication link to a base station 104 that is interconnected to a network 106, which may be a single network or a combination of different networks, such as, for example, the public switched telephone network (PSTN) or the Internet, to name but two possible networks. Also included in this embodiment is a server 110 which is interconnected with network 106. Server 110 may be accessible by accessible by a network administrator 112. While wireless device 102 is shown as connecting to network 106 through base station 104, it is possible that wireless device 102 may be directly connected to network 106 through a wired network access device 114 or internet service provided. Wireless device 102 may connect to network access device 114 using a wired connection, such as, for example, a universal serial bus, or a wireless connection, such as, for example, a Bluetooth connection, or the like. Wireless device 102 also may be directly connectable to sever 110 via direct conventional connection 116, such as, for example, a USB cable, other data port connection, a Bluetooth connection, or another local wireless connection.

Figure 2:
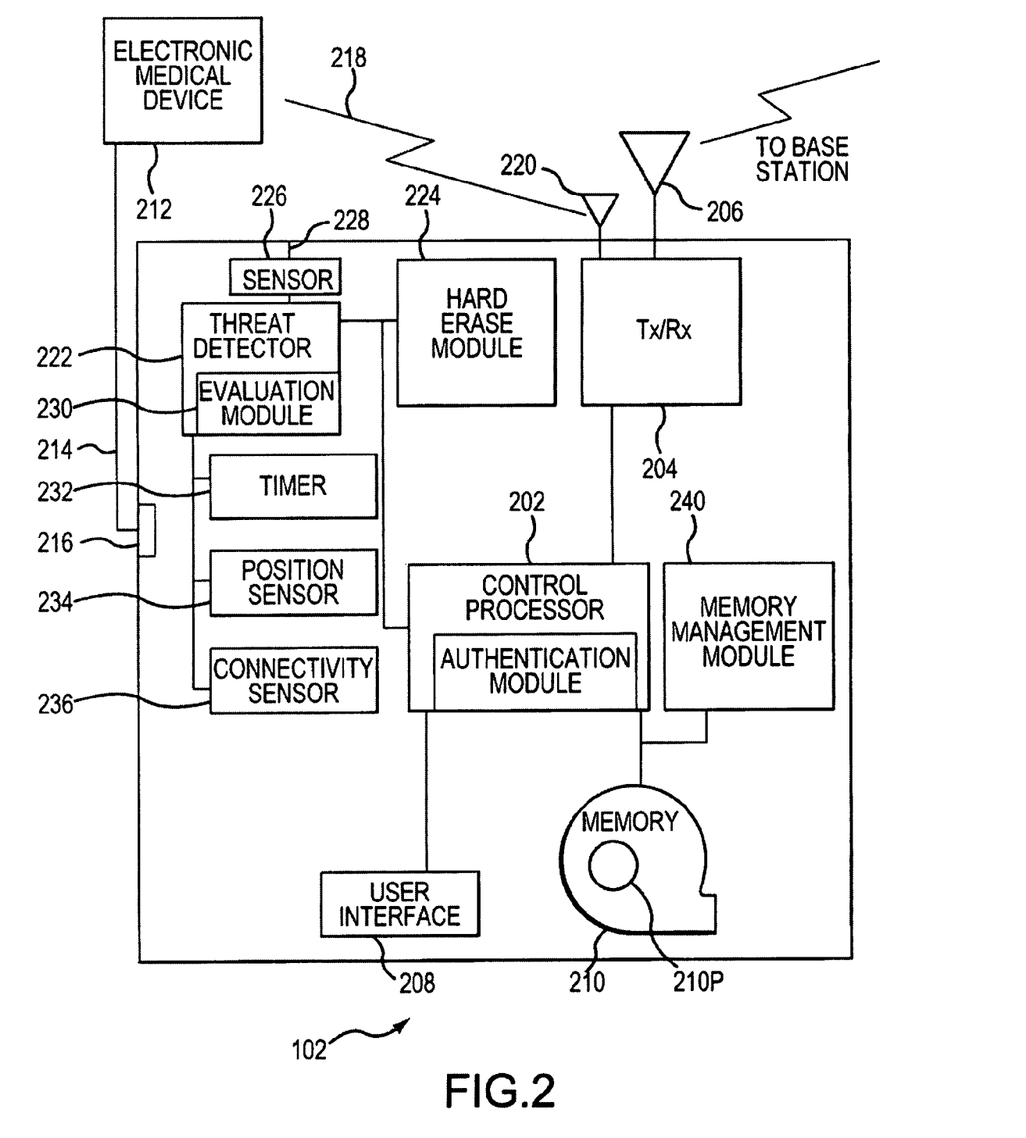
FIG. 2 is a block diagram illustration of a wireless device of an exemplary embodiment of the disclosure.

Referring now to FIG. 2, an exemplary embodiment of wireless device 102 is shown in more detail. Wireless device includes several components including a control processor 202. Control processor 202 controls the major functions of wireless device 102 including providing computing functionality to process the inputs and/or data required for the operation of wireless device 102. Transmit/receive circuitry 204 is connected to control processor 202 and antenna(s) 206. Transmit/receive circuitry 204 may be one or more actual circuits and may work over various protocols and wavelengths. Transmit/receive circuitry 204 functions typical of such components as used in wireless communications, such as modulating signals received from the control processor 202 that are to be transmitted from antenna 206, and demodulating signals received at antenna 206. The demodulated signal is provided to control processor 202. Wireless device 102 also provides a user interface 208. User interface 208 may comprise a user interface typical of a cellular phone or typical of the wireless device, such as, for example, a keyboard, alphanumeric pad, mouse, track ball, touch screen, voice recognition, microphones, speakers, data ports, input ports, video input (camera or the like), or the like. The user of wireless device access, receives, and transmits information via user interface 208. Wireless device 102 includes a memory 210 connected to control processor 202. Memory 210 may store data and processing instructions necessary or convenient for operation of wireless device 102. Memory 210 may include volatile and/or nonvolatile memory on any suitable media. Memory 210 may comprise multiple memories, but a single memory is provided. Memory 210 also stores information input by the user. Such information may, for example, include information input through the user interface 208 including pictures, textual information, video, etc. as well as information received from a remote processor. The remote processor may be, for example, server 110 described above, which may be connectable to wireless device 102 via network 106 or a direct connection 116. Such information also may include information received by wireless device 102 through other mechanisms, such as, for example, applications residing on wireless device 102 may receive or generate information and store such information in memory 210. One example of such information includes an electronic medical device 212 downloading information to wireless device 102, which wireless device could store for eventual transmission or downloading to a caregiver, medical personnel or the like. Electronic medical device 212 could be integrated into wireless device 102 or separate from wireless device 102 as shown. If separate, information may be transmitted from electronic medical device 212 to wireless device 102 using any connectional connections, such as, for example, a wired connection 214 to serial data port 216, a wireless connection 218 to a Bluetooth antenna 220, or the like. While the technology of the present application will be described in relation to medical information of the user, one of ordinary skill in the art will now recognize that other types of personal information may benefit from the present invention. Other types of personal information include, pictures, audio clips, video clips, audio/video clips, financial information, purchasing information, location information, passwords, client lists, and the like.

Some portions of memory 210, protected memory 210*p*, may be accessible only after authentication of permission to access protected memory 210*p*. Access to protected memory 210*p* may be granted by control processor 202 using known protection techniques including, password protection, biometric protection (voice print, finger print, eye scan, etc), encryption or the like.

Wireless device 102 also includes a threat detector 222 and a hard erase module 224. Threat detector 222 monitors, as explained below, the status of wireless device 102 and uses the monitored status to determine unauthorized or inappropriate access to data on wireless device 102 is possible. Threat detector 222 uses the monitored information as a proxy for indicating wireless device 102 has been stolen, lost, or is being used inappropriately. Threat detector 222 and hard erase module 224 may be stand alone devices, as shown, combined into a single device, incorporated into control processor 202, or other portions of wireless device 102 as a matter of design choice. Threat detector 222 and hard erase module 224 may be directly connected or connected through control processor 202. Threat detector 222, as will be explained further below, monitors wireless device 102 for inappropriate requests to access either memory 210 or protected memory 210*p*. On detection of a threat, threat detector 222 will provide a threat alert or hard erase request to hard erase module 224 to hard erase memory 210, protected memory 210*p*, designated portions of memory 210 or 210*p*, or a combination thereof. Threat detector 222 may be incorporated into server 110 instead of wireless device 102 as a matter of design choice. In some instances it may be preferable to have threat detector 222 incorporated into wireless device 102 and in some instances it may be preferable to have threat detector 222 incorporated into server 110, or a combination of both the wireless device 102 and the server 110.

Threat detector 222 may include a sensor array 226. Sensor array 226 may monitor wireless device 102 for inappropriate activity including for example, sensor array 226 may provide an electronic circuit 228 about a perimeter of wireless device 102. If an individual inappropriately attempted to open wireless device 102, electronic circuit 228 would convert to from a closed circuit an open circuit. The open circuit detection would indicate a potential threat to threat detector 222 that would trigger hard erase module 224 to perform a hard erase of memory. Other sensor arrays would similarly monitor inappropriate physical activity to the wireless device 102 and similarly provide alerts or the like to threat detector 222 to trigger a hard erase of memory.

If memory 210 has a protected portion 210*p* accessible only after appropriate authentication, threat detector 222 would monitor the authentication procedure to determine whether a threat is present. Threat detection may occur if, for example, an incorrect password is input over a predetermined number of times, such as 5 times. For biometric measures, threat detection may occur if the biometric measure is incorrect.

Threat detector 222 may incorporate an evaluation module 230. Evaluation module 230 may make a determination on closeness of the authentication prior to determining whether a threat exists. For example, threat detector 222 may be programmed to trigger a hard erase by hard erase module 224 if a password is improperly input 5 times regardless of how close the incorrect password is to the correct password. Evaluation module 230 may evaluate a threat however after a single incorrect entry if the entry is sufficiently different from the correct password. If the password, for example, is 12345 and the entry is 12354, evaluation module 230 may identify the transposition as sufficiently close to not send a threat alert. However, if the entry provided 94870, evaluation module 230 would identify no similarity to the actual password and send a threat alert after a single password attempt. Alternatively, evaluation module 230 may be incorporated control processor 202, a stand alone unit, or the like.

Moreover, evaluation module 230 may be provided with different sensitivity in view a status of wireless device 102. As explained above and below, wireless device 102 may synchronize with main (and generally remote) memory associated with, for example, a server 110. If the memory 210, protected memory 210*p*, combinations of memory 210 and protected memory 210*p*, or the like have been synchronized with the main memory, evaluation module 230 may be set for more aggressive threat detection as the cost of memory loss is reduced by the synchronization. However, as wireless device 102 increases the amount of un-synchronized data, evaluation module 230 may be set (manually or automatically) to be less aggressive in threat detection due to the relatively higher costs associated with irretrievable deleting memory and data through a hard erase procedure. Thus, the evaluation module may provide an adjustable scale (manually or automatically) to balance the risk of losing valuable information or data against the risk of disclosure of the information. Such an adjustable scale may be based on numerous factors including, for example, the amount of data stored to the device and the amount of data not uploaded to a main memory or the like.

As explained further below, prior to triggering a hard erase of memory 210, threat detector 222 may cause control processor 202 to attempt to upload the appropriate memory 210 to server 110 to preserve the user's data.

Threat detector 222 should be capable of receiving a hard erase request from control processor 202 as well. In this case, the user of wireless device 102 may input a request using user interface 208. Alternatively, the user of wireless device 102 also may transmit a request from server 110 or a separate device connected that can communicate with wireless device 102, to cause a hard erase.

Threat detector 222 may be connected other sensors 226 as well. For example, threat detector 222 may include a timer 232. Timer 232 may be integrated with control processor 202, threat detector 222, or the like, or a separate unit as shown. Timer 232 may reset when wireless device is in use, when a password is entered, or when a connection to network 106 is established, or the like. After a predetermined period of time, which would probably be a relatively long time, but could be minutes, hours, days, months, weeks, etc., timer 232 would provide an inactive device indication to threat detector 222. Threat detector 222 would view the inactive device indication as a threat as inaction would be a proxy for a lost or stolen wireless device and cause a hard erase. Prior to initiating a hard erase, optionally, threat detector 222 may request a password from the user. If the password is incorrectly entered or no response is received for a period of time, the hard erase may trigger.

Threat detector 222 also may include a positioning sensor 234. Positioning sensor 234 may be integrated with control processor 202 or threat detector 222 or a separate unit as shown. Positioning sensor 234 is capable of determining a location for wireless device 102. Positioning sensor 234 would provide threat detector 222 with positioning information, such as, for example, from a global positioning satellite system, and threat detector 222 may determine a threat exists if wireless device 102 is outside a predetermined location boundary.

Threat detector 222 also may include a connectivity sensor 236. Connectivity sensor 236 may be integrated with control processor 202 or threat detector 222 or a separate unit as shown. Connectivity sensor 236 monitors connectivity to network 106. If connectivity sensor 236 determines connectivity has not been established over a predetermined period of time, a lack of connectivity signal may be provided to threat detector 222 that would trigger a hard erase.

Wireless device also may include a memory management module 240. Memory management module 240 may be integrated with control processor 202 or threat detector 222 or a separate unit as shown. Memory management module 240 is used to minimize personal information in memory 210, protected memory 210p, or a combination thereof. Thus, memory management module 240 would monitor for synchronization with a main memory 242 (FIG. 1), such as a main memory 242 associated with server 110. Main memory 242 may be associated with a separate processor 118, shown in phantom in FIG. 1. Separate processor 118 may be the user's personal computer or any conventional device. Once synchronization with main memory 242 is accomplished, memory management module 240 would send a hard erase signal to hard erase module 224 to cause the synchronized data to be removed from memory 210, protected memory 210p, or a combination thereof of wireless device 102.

Some wireless devices 102 are provided with plug-in modules 120 that are removably attached to wireless device 102. Such modules 120 may include, for example, MP3 players, audio/video equipment, electronic medical devices, or the like. These removable modules 120 generate data that may be stored in memory 210, protected memory 210p, or a combination thereof of, in wireless device 102. Threat detector 222, memory management module 240, or the like (such as a separate plug-in device monitor as part of sensor array 226) may detect when the removable module 120 is removed from wireless device 102 and cause a hard erase of the associated memory by hard erase module 224.

Threat detector 222 may provide a continual "no threat" signal to hard erase module 224. In this case, instead of providing a trigger signal to hard erase module 224 to trigger a hard erase of memory, the absence of the no threat signal may trigger the hard erase function.

Referring now to FIG. 3-9, operational steps for causing hard erasure of memory associated with wireless device 102 are now described for an exemplary embodiment. It is noted, at the outset, that the operational steps described in any of the exemplary embodiments are described to provide examples and discussion. The operations described may be performed in numerous different sequences other than the illustrated sequences. Further, operations described in a single operational step may actually be performed in a number of different steps. Additionally, one or more operational steps discussed in the exemplary embodiments may be combined. Moreover, operational steps described as occurring at one processor may be performed at other processors. It is, therefore, to be understood that the operational steps illustrated in the flow charts and diagrams may be subject to numerous different modifications as will be readily apparent to one of skill in the art on reading the present disclosure. Moreover, the illustrations that follow provide for the threat detector 222 to be co-located with the wireless device 102. Threat detector 222, however, could be remotely located as a matter of design choice which will be now recognized by one of ordinary skill in the art.

Figure 3:
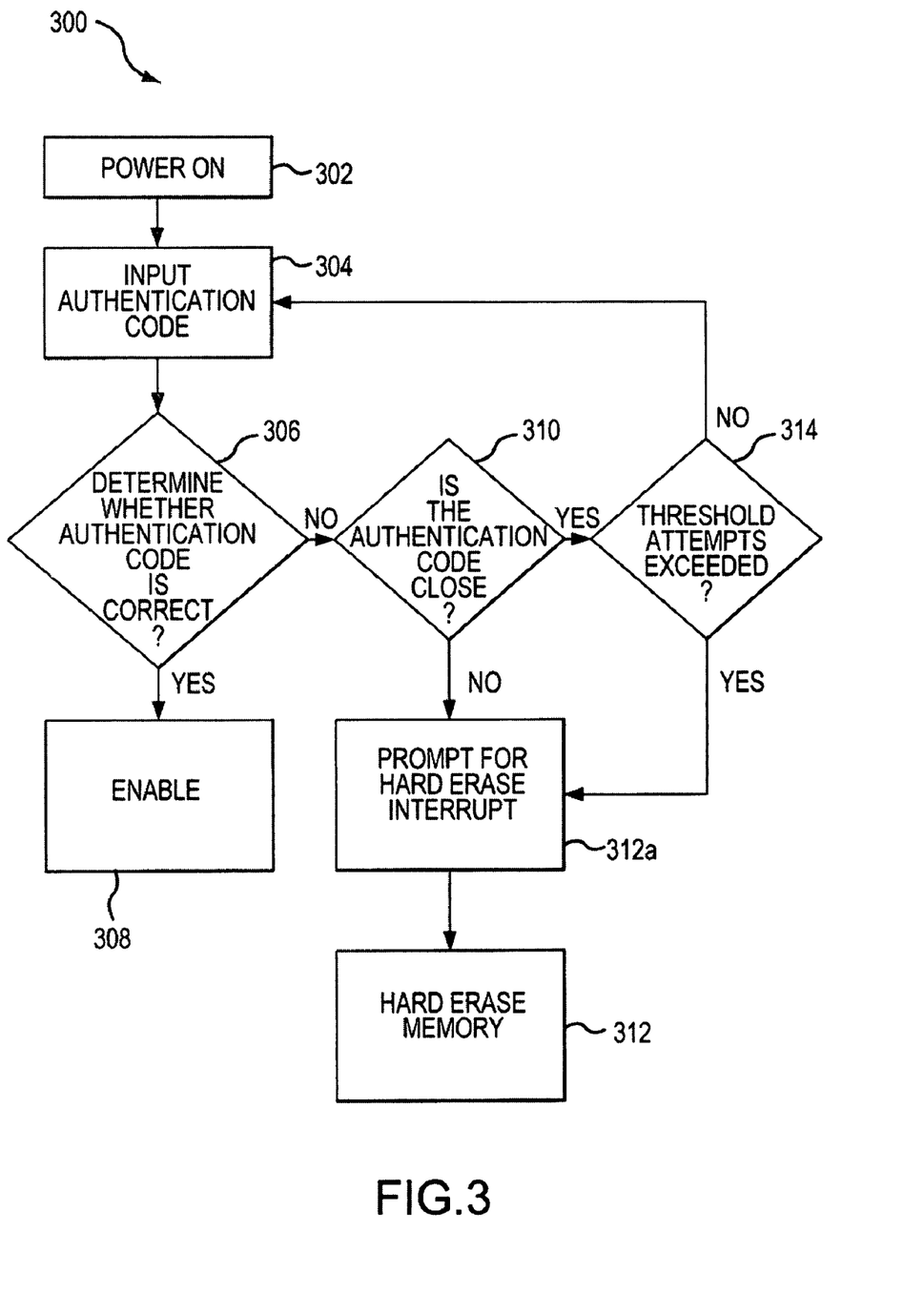
FIG. 3 is a flow chart diagram illustrating the operational steps for operating a wireless device of an exemplary embodiment.

Referring first to FIG. 3, a power on operation 300 of an exemplary embodiment is provided. First, at step 302, wireless device 102 is powered. Optionally, the user 108 may be prompted to input an authentication code, step 304. Authentication code could be using user interface 208 to enter a password, a biometric, or the like. Threat detector would evaluate the password entry to determine whether it was correct, step 306. If the authentication code is correct wireless device 102 is enabled for operations, step 308. If the authentication code is incorrect, optionally it is further determined whether the entered authentication code is sufficiently close to the correct code as to be a mistake step 310. If it is determined that the authentication code is not sufficiently close and/or the optional step 310 is not performed, hard erase module 224 hard erases the memory 210 or designated portions thereof, step 312. If it is optionally determined that the authentication code is sufficiently close, it is next determined if a predetermined number of entry authentication code entry attempts have been made, step 314. If it is determined the predetermined number has not been exceeded, the user is prompted to re-input the authentication code when control returns to step 304. If the predetermined number has been exceeded, hard erase module 224 hard erases the memory 210 or designated portions thereof, step 312. Optionally, prior to the hard erasure step 312, wireless device 102 may prompt the user for a hard erasure interrupt code, step 312a. Typically, the interrupt code would need to be entered within a predetermined timeframe otherwise the erasure would continue. Hard erasure interrupt code may be different than the authentication code. The interrupt code being entered may interrupt the erasure of the memory, but would lock the wireless device features or portions of those features until a proper authentication code was entered. While described as a power on or power up illustrative operation, one of ordinary skill in the art would now recognize on reading the disclosure that the operation 300 could be applicable to access wireless device 102 after a predetermined period of inactivity, if the device has been locked, or if access to particular functionality or memory is requested.

Figure 4:
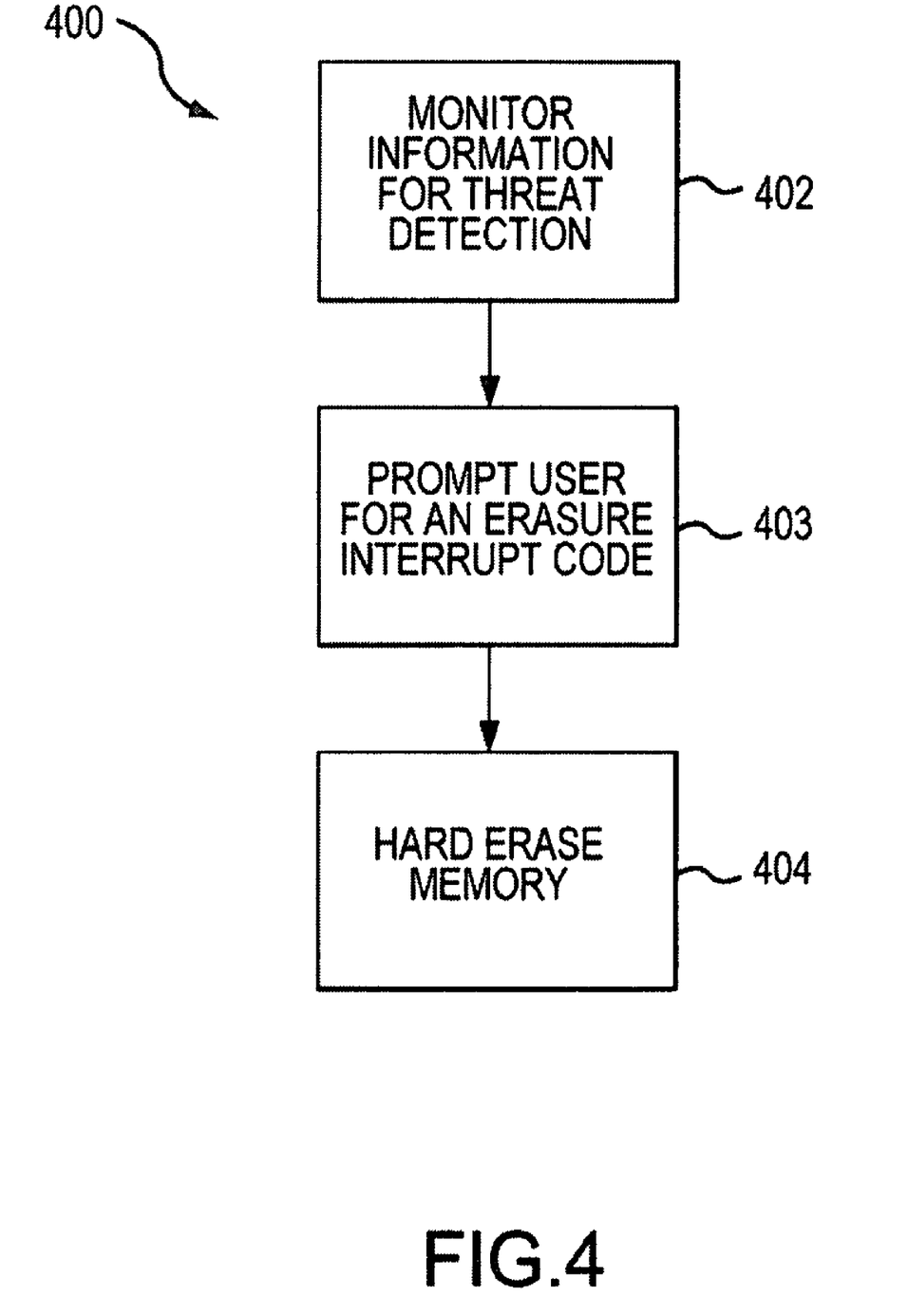
FIG. 4 is a flow chart diagram illustrating the operational steps for operating a wireless device of an exemplary embodiment.

Referring next to FIG. 4, a threat monitoring operation 400 of an exemplary embodiment is provided. During normal operation, threat detector 222 monitors information, which will be explained further below, regarding wireless device 102 for threat indications, step 402. If a threat is detected, threat detector 222 causes hard erase module 224 to erase memory 210 or portions thereof, step 404. Optionally, at step 403, the user may be prompted for an erasure interrupt code to interrupt the hard erase operation by the user in case the hard erase was improperly issued. Typically, the interrupt would need to be entered within a predefined amount of time to interrupt the erasure.

Figure 5:
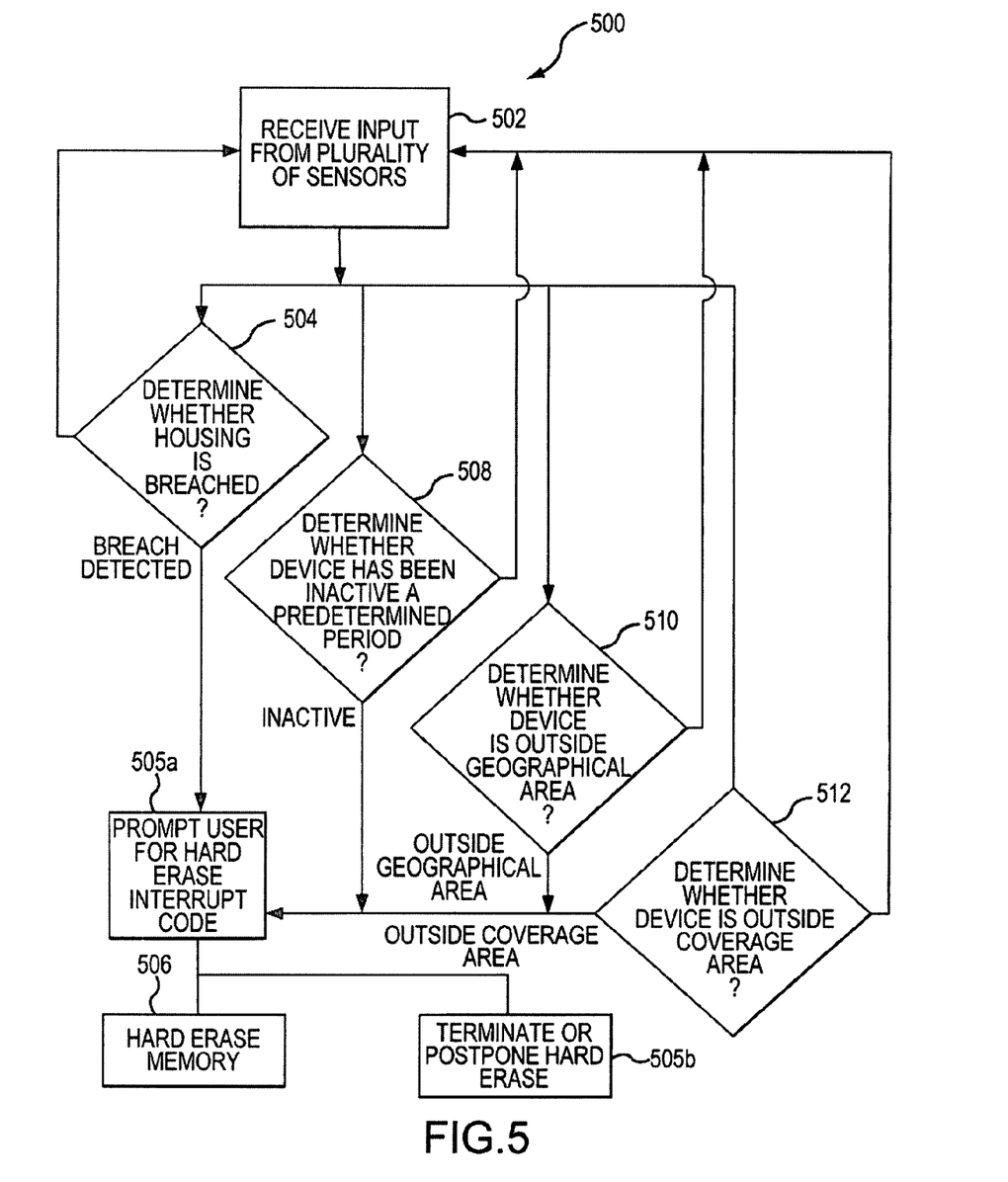
FIG. 5 is a flow chart diagram illustrating the operational steps of a threat detector of an exemplary embodiment.

Referring now to FIG. 5, an exemplary operation 500 of threat detector 222 is provided. Threat detector 222 receives a series of inputs from a plurality of sensors actin as a proxy for inappropriate access to memory 210, step 502. While described as a plurality of sensors, one of skill in the art will now recognize on reading the disclosure that more, less, or different inputs are possible within the scope and spirit of the technology described herein. The plurality of sensors may include, for example, a physical tampering sensor or house breach sensor, such as circuit 228, a timer 232, a position sensor 234, a connectivity sensor 236, or the like as described above. Based on these inputs, threat detector 222 makes various determinations regarding a threat to wireless device 102. For example, based on input from circuit 228, threat detector 222 determines whether a housing for wireless device 102 is being breached, step 504. If the sensor indicates the housing is being breached, threat detector 222 causes hard erase module 224 to erase memory 210 or portions thereof, step 506. Based on input from timer 232, threat detector determines if wireless device 102 has been inactive for a predetermined amount of time, step 508. If it is determined the device has been inactive for a predetermined amount of time, threat detector 222 concludes the device is stolen or lost and causes hard erase module 224 to erase memory 210 or portions thereof, step 506. Based on input from position sensor 234, threat detector determines if wireless device 102 has exited a predefined boundary or geographical area, step 510. If it is determined that wireless device 102 has exited the predefined boundary, threat detector 222 causes hard erase module 224 to erase memory 210 or portions thereof, step 506. Based on input from connectivity sensor 236, threat detector determines if wireless device 102 has been out of the coverage area, step 512. If it is determined that wireless device 102 is out of the coverage area, threat detector 222 causes hard erase module 224 to erase memory 210 or portions thereof, step 506. As mentioned, threat detector may trigger off more, less, or other sensors than those described above. Additionally, threat detector may trigger off of combinations thereof, such as, for example, if threat detection may only occur when it is determined by position sensor 234 that the device is outside a geographical boundary and it has been outside the boundary for a predetermined time as determined by timer 232. Optionally, at step 505*a* and 505*b*, on indication of a threat by thread detector 222, wireless device 102 may prompt the user to input a hard erase interrupt code, step 505*a*. If the interrupt code is entered, the hard erase is terminated or postponed, step 505*b*.

Figure 6:
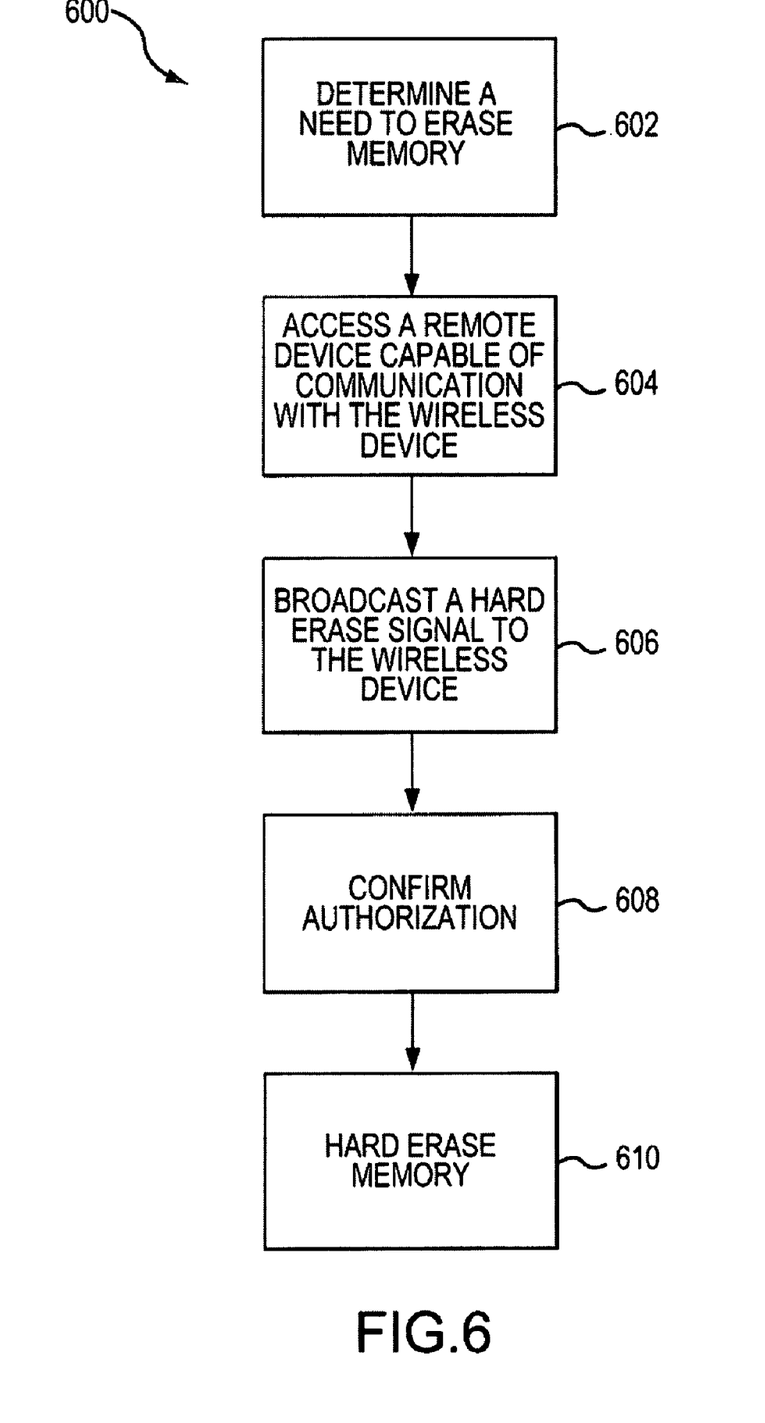
FIG. 6 is a flow chart diagram illustrating the operational steps of a manual hard erase of an exemplary embodiment.

Referring now to FIG. 6, an exemplary operation 600 of wireless device 102 is provided where a user actively signals to erase memory 210 or a portion thereof. This operation provides user 108 with the ability to remotely hard erase memory 210 by providing a hard erase signal. In this example, user 108 would determine the need to erase memory 210 or portions thereof, step 602. The user would access server 110, directly or remotely, step 604, and cause server 110 to broadcast an erase signal to wireless device 102, step 606. The erase signal would cause either threat detector 222 or control processor 202 to trigger hard erase module 224 to erase memory 210, step 608. Optionally, at step 607, wireless device 102 may request an authentication code from user 108 prior to erasing the memory. Remote erasure could be caused by user 108 or an administrator 112.

Figure 7:
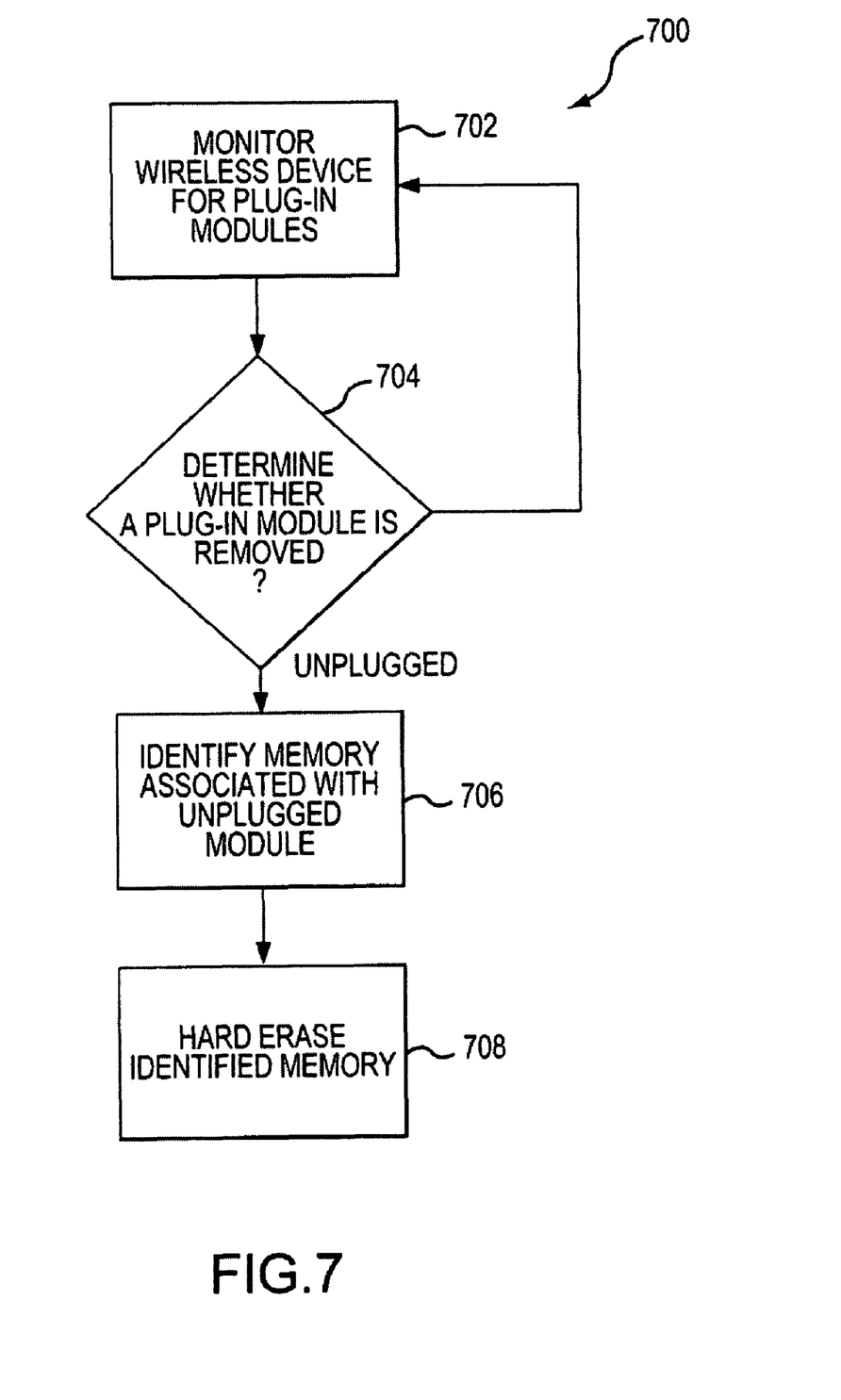
FIG. 7 is a flow chart diagram illustrating the operational steps of memory management of an exemplary embodiment.

As can be appreciated, the above operations are to prevent inappropriate access to personal, sensitive, and potentially embarrassing information in memory 210 from being accessed by a third party. The above provides measures too for erasure of the information on particular conditions. However, it is possible, using memory management module 240 to reduce the amount of personal, sensitive, and potentially embarrassing information in memory 210. Referring now to FIG. 7, an exemplary operation 700 of memory management module 240 is provided. First, memory management module 240 (or some other component associated with the wireless device) monitors wireless device 102 for plug-in modules, step 702. Next, memory management module 240 determines whether a plug-in module being monitored is unplugged from wireless device 102, for example, if electronic medical device 212 is removed from serial data port 216, step 704. If it is determined that the device is unplugged, memory management module 240 identifies portions of memory 210 associated with the unplugged module, step 706. Finally, memory management module 240 causes hard erase module 224 to erase the portions of memory 210 associated with the unplugged module, step 708. This deletes information from memory once the information is no longer needed.

Figure 8:
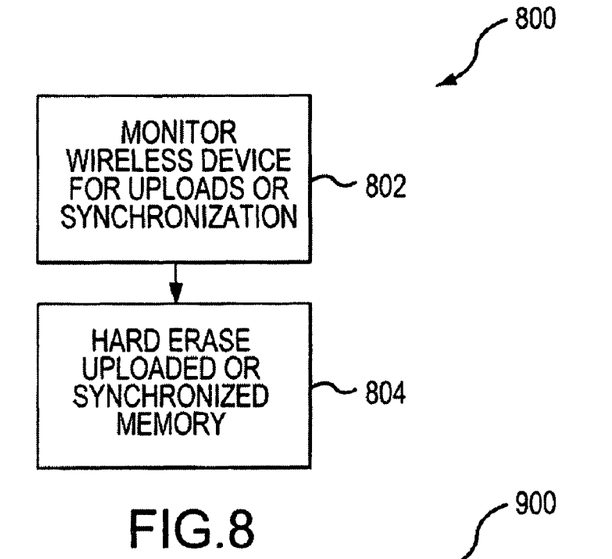
FIG. 8 is a flow chart diagram illustrating the operational steps of memory management of an exemplary embodiment.
Figure 9:
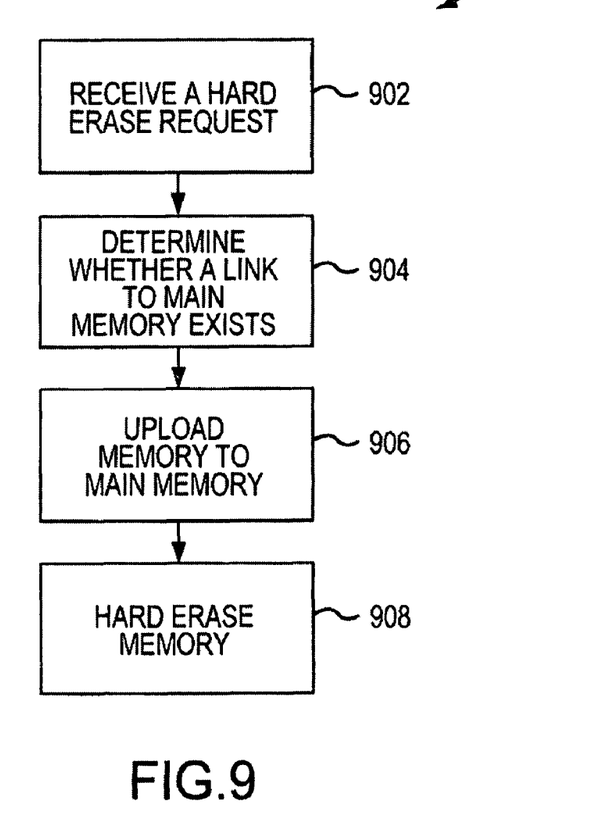
FIG. 9 is a flow chart diagram illustrating the operational steps of uploading memory prior to hard erasing the memory of an exemplary embodiment.

Referring to FIG. 8, another exemplary operation 800 of memory management module 240 is provided. In this case, memory management module monitors wireless device 102 for uploads or synchronization with a main memory 242, step 802. When an upload or synchronization of memory between memory 210 and main memory 242 is detected, memory management module causes a hard erase of the associated uploaded memory, step 804. Thus, when information is stored in a more permanent and secure location, i.e., main memory 242, the information may be erased from the less secure wireless device 102.

As mentioned above, and in reference to FIG. 9, it may be desired to attempt to upload information from wireless device 102 to a main memory 242 prior to any hard erase procedure. As shown in an exemplary operation 900, hard erase module 224 first receives a hard erase request from either any of threat detector 222, memory management module 240, or user 108, step 902. Next, hard erase module 224 determines whether a link to main memory 242 exists, step 904. If it is determined the link exists, hard erase module 224 causes memory 210 or portions thereof to be uploaded to main memory 242, step 906. Once the upload is complete, or if a link is determined not to exist, hard erase module 224 erases memory 210 or portions thereof, step 908.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would ether appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method performed by a wireless device for automatically hard erasing data on the wireless device based on a threat determination to inhibit unauthorized access to data, the method comprising:
   storing personal and/or sensitive data in a memory space of the wireless device;
   monitoring sensors in the wireless device that provide information relating to a status of the wireless device, the monitoring of sensors comprising:
      monitoring a housing of the wireless device for a breach;
      monitoring a period of user input inactivity of the wireless device;
      monitoring a positioning sensor for determination of whether the wireless device has exited a geographical boundary; and
      monitoring a connectivity sensor for determination of whether the wireless device has exited a network coverage area;
   automatically determining whether a threat to data contained in the wireless device exists based on the information from the sensors relating to the status of the wireless device;
   prompting a user for entry of a hard erase interrupt code to interrupt a hard erase of data in response to determining that a threat to data contained in the wireless device exists;
   determining if a hard erase interrupt code has been entered within a predetermined timeframe;
   terminating or postponing a hard erase of data if it is determined that the hard erase interrupt code has been correctly entered within the predetermined timeframe;
   hard erasing the data contained on the wireless device by replacing the personal and/or sensitive data in the memory space with new data if it is determined that the hard erase interrupt code has not been correctly entered within the predetermined timeframe; and
   monitoring entry of an authentication code on the wireless device and hard erasing the data stored in the wireless device if the authentication code violates predetermined conditions, wherein the predetermined conditions include evaluating closeness of the entered authentication code and extending a threshold number of attempts upon determination of a close, but incorrectly entered, authentication code.

2. The method of claim 1, wherein the predetermined conditions include exceeding a threshold number of attempts.

3. The method of claim 1, further comprising:
   detecting when plug-in modules selected from the group consisting of MP3 players, audio/video equipment, and electronic medical devices are removed from a serial data port of the wireless device; and
   hard erasing data associated with the removed plug-in module from the memory of the wireless device.

4. The method of claim 1, further comprising:
   the wireless device detecting data synchronization with a main memory on another device; and
   the wireless device hard erasing the synchronized data from the memory of the wireless device.

5. The method of claim 1, wherein the personal and/or sensitive data is uploaded to a main memory prior to hard erasing the personal and/or sensitive data.

6. A wireless device, comprising:
   a control processor for controlling functions of the wireless device;
   a memory to store executable code usable by the control processor to perform the functions of the wireless device and to store personal and/or sensitive data;
   transmit and receive circuits to provide modulation and demodulation of communication signals between an antenna and the control processor;
   a threat detector to monitor the wireless device to determine threats to the data stored in memory, the threat detector operatively connected to:
      a sensor monitoring a housing of the wireless device for a breach;
      a timer monitoring a period of user input inactivity of the wireless device;
      a positioning sensor determining whether the wireless device has exited a geographical boundary; and
      a connectivity sensor determining whether the wireless device has exited a network coverage area; and
   a hard erase module to hard erase at least a portion of the memory to remove data on a threat indication from the threat detector;
   wherein the threat detector is further configured to:
      prompt a user for entry of a hard erase interrupt code to interrupt a hard erase of data in response to determining that a threat to the data stored in memory exists;
      determine if a hard erase interrupt code has been entered within a predetermined timeframe;
      terminate or postpone a hard erase of data if it is determined that the hard erase interrupt code has been correctly entered within the predetermined timeframe;
      cause the hard erase module to hard erase the data contained on the wireless device by replacing the personal and/or sensitive data in the memory with new data if it is determined that the hard erase interrupt code has not been correctly entered within the predetermined timeframe; and
      an authentication module to authenticate a user, wherein the threat detector is coupled to the authentication module and determines a threat to the data exists based on an authentication code being incorrect and failing to meet predefined similarity thresholds, wherein the threat detector comprises an evaluation module that evaluates the authentication code and determines a threat to the data exists based on evaluating a closeness of an incorrectly entered authentication code.

7. The wireless device of claim 6, wherein the threat detector determines a threat to the data exists based on a predefined period of inactivity.

8. The wireless device of claim 6, wherein the threat detector determines a threat to the data exists based on the wireless device exiting a predefined geographical area.

9. The wireless device of claim 6, wherein the threat detector determines threat to the data exists based on the wireless device exiting a network coverage area.

10. The wireless device of claim 6, wherein the wireless device is connectable to a main memory on another device to upload the personal and/or sensitive data on the wireless device to the main memory.

11. The wireless device of claim 10, further comprising a memory management module to detect personal and/or sensitive data uploaded to the main memory and hard erase the uploaded personal and/or sensitive data from the memory of the wireless device.

12. The wireless device of claim 6, wherein the threat detector causes the hard erase module to hard erase at least a portion of the personal and/or sensitive data stored on the wireless device memory by removing a no threat signal.

13. A non-transitory computer readable storage medium having stored thereon computer-executable instructions configured to cause a processor of a wireless device to perform a method for automatically hard erasing data on the wireless device based on a threat determination to inhibit unauthorized access to data, the method comprising:
- monitoring sensors in the wireless device that provide information relating to a status of the wireless device, the monitoring of sensors comprising:
  - monitoring a housing of the wireless device for a breach;
  - monitoring a period of user input inactivity of the wireless device;
  - monitoring a positioning sensor for determination of whether the wireless device has exited a geographical boundary; and
  - monitoring a connectivity sensor for determination of whether the wireless device has exited a network coverage area;
- automatically determining whether a threat to personal and/or sensitive data contained in a memory space the wireless device exists based on the information from the sensors relating to the status of the wireless device;
- prompting a user for entry of a hard erase interrupt code to interrupt a hard erase of data in response to determining that a threat to data contained in the wireless device exists;
- determining if a hard erase interrupt code has been entered within a predetermined timeframe;
- terminating or postponing a hard erase of data if it is determined that the hard erase interrupt code has been correctly entered within the predetermined timeframe;
- causing a hard erase of the personal and/or sensitive data contained in the memory space of the wireless device by replacing the personal and/or sensitive data in the memory space with new data if it is determined that the hard erase interrupt code has not been correctly entered within the predetermined timeframe; and
- monitoring entry of an authentication code on the wireless device and hard erasing the data stored in the wireless device if the authentication code violates predetermined conditions, wherein the predetermined conditions include evaluating closeness of the entered authentication code and extending a threshold number of attempts upon determination of a close, but incorrectly entered, authentication code.

14. A wireless device, comprising:
- a control processor;
- means for storing executable code usable by the control processor to perform the functions of the wireless device and personal and/or sensitive data;
- means for transmitting and receiving to provide modulation and demodulation of communication signals between an antenna and the control processor; and
- means for detecting a threat to data stored in means for storing, the means for detecting a threat to data comprising:
  - means for monitoring a housing of the wireless device for a breach;
  - means for monitoring a period of user input inactivity of the wireless device;
  - means for monitoring positioning for determination of whether the wireless device has exited a geographical boundary; and
  - means for monitoring connectivity for determination of whether the wireless device has exited a network coverage area; and
- means for hard erasing at least a portion of the memory to remove data when the means for detecting detects a threat to the data stored in the means for storing;
- wherein means for detecting a threat to data comprises:
  - means for automatically determining whether a threat to data contained in the wireless device exists based on the information from the plurality of means for monitoring;
  - means for prompting a user for entry of a hard erase interrupt code to interrupt a hard erase in response to a determination that a threat to the data stored in memory exists;
  - means for determining if a hard erase interrupt code has been entered within a predetermined timeframe;
  - means for terminating or postponing the hard erase of data if it is determined that the hard erase interrupt code has been correctly entered within the predetermined timeframe;
  - means for causing the means for hard erasing to hard erase the personal and/or sensitive data contained on the wireless device by replacing the personal and/or sensitive data in the memory with new data if it is determined that the hard erase interrupt code has not been correctly entered within the predetermined timeframe; and
  - means for authenticating a user, wherein the means for detecting a threat is coupled to the means for authenticating a user and determines a threat to the data exists based on an authentication code being incorrect and failing to meet predefined similarity thresholds, wherein the means for detecting a threat comprises evaluation means that evaluates the authentication code and determines a threat to the data exists based on evaluating a closeness of an incorrectly entered authentication code.

* * * * *